US006927354B1

(12) United States Patent
Brown et al.

(10) Patent No.: US 6,927,354 B1
(45) Date of Patent: Aug. 9, 2005

(54) TRIBOCHARGING AND ELECTROSTATIC SEPARATION OF MIXED ELECTRICALLY INSULATING PARTICLES

(75) Inventors: James D. Brown, London (CA); Paul F. Wynen, London (GB); Thomas E. Doyle, Oshawa (CA)

(73) Assignee: The University of Western Ontario, London (CA)

( * ) Notice: Subject to any disclaimer, the term of this patent is extended or adjusted under 35 U.S.C. 154(b) by 0 days.

(21) Appl. No.: 10/181,755

(22) PCT Filed: Jan. 21, 2000

(86) PCT No.: PCT/CA00/00058

§ 371 (c)(1),
(2), (4) Date: Nov. 6, 2002

(87) PCT Pub. No.: WO01/52998

PCT Pub. Date: Jul. 26, 2001

(51) Int. Cl.[7] .............................................. B03C 7/00
(52) U.S. Cl. .................................. 209/127.2; 209/579
(58) Field of Search .......................... 209/127.2, 127.3, 209/128, 129, 546, 551, 579, 380, 401

(56) References Cited

U.S. PATENT DOCUMENTS

| 3,941,479 | A | * | 3/1976 | Whitehead ................. 356/335 |
| 4,318,483 | A | * | 3/1982 | Lombardo et al. ............ 209/3.1 |
| 5,289,922 | A |   | 3/1994 | Inculet et al. |
| 5,591,895 | A | * | 1/1997 | Rigby ....................... 73/28.01 |
| 6,011,229 | A | * | 1/2000 | Geisler et al. ............ 209/127.4 |
| 6,271,492 | B1 | * | 8/2001 | Maehata et al. ......... 209/127.1 |
| 6,452,126 | B1 | * | 9/2002 | Xiao et al. ............... 209/127.1 |

FOREIGN PATENT DOCUMENTS

| DE | 829 282 | 1/1952 |
| EP | 0 504 451 | 9/1992 |
| WO | WO 9103029 A | * 3/1991 .......... A01K 61/00 |

OTHER PUBLICATIONS

Patent Abstracts of Japan, vol. 1995, No. 10, Nov. 30, 1995 & JP 07 178351 A (Densen Sogo Gijutsu Center), Jul. 18, 1995 abstract.
O.C. Ralston: "Electrostatic Separation of Mixed Granular Solids" 1961, Van Nostrand Comp., New York US XP002146170, p. 82; figure 33.

(Continued)

Primary Examiner—Donald P. Walsh
Assistant Examiner—Joseph C Rodriguez
(74) Attorney, Agent, or Firm—Pedersen & Co., PLLC; Ken J. Pedersen; Barbara S. Pedersen

(57) ABSTRACT

An apparatus for tribocharging particles of electrically insulating materials has a rotatable drum (1), made of a metallic material, for containing the particles. The drum has an inlet (11), for charging material, and an outlet (13), for discharging material. The drum further has means (7) for rotating the drum about an axis of rotation, the orientation of the axis of rotation being such that, in operation of the apparatus, the particles tumble against each other and against the walls of the vessel, thereby becoming tribocharged. A fines removal mesh screening means (10) is attached to an outer surface of the drum, allowing fines to escape from the drum. An electrostatic separation tower (20), having tapering walls and at least one pair of electrodes (24) arranged on opposite walls of the tower, is aligned to receive discharged material from the drum. The tower separates the particles, falling from the drum into the tower (20), in an electric field generated between the electrodes (24).

11 Claims, 9 Drawing Sheets

OTHER PUBLICATIONS

S. Masuda et al: "Electrostatic Beneficiation of Coal Using a Cyclone-Tribocharger" IEEE Transactions on Industry Applications, vol. 1A, No. 5. Sep.-Oct. 1983, pp. 789-783, XP0021461169, IEEE Inc., New York, US, ISSN: 0093-9994, p. 790, col. 2, paragraph 2; figure 4.

* cited by examiner

US 6,927,354 B1

TRIBOCHARGING AND ELECTROSTATIC SEPARATION OF MIXED ELECTRICALLY INSULATING PARTICLES

TECHNICAL FIELD

This invention relates to improvements in electrostatic separation of materials, particularly mixed plastic waste materials. Such separation is particularly desirable for the purpose of recycling and reusing the materials. The invention may also be used for separating other electrically insulating materials from each other, or from conductive materials such as metals.

Waste plastic is typically derived from either garbage or from production waste during the manufacture of plastic consumer goods, and there is a need to separate different types of plastic. Electrostatic separation, i.e. separating plastics according to their electrostatic charges, is known as one means of accomplishing this desired separation. The waste plastic is first chopped or shredded into relatively small particles, and then separated electrostatically after charging by suitable means.

Electrostatic charges build up on electrically insulating materials (including most plastics) when different such materials, having different work functions, are brought into contact. Assuming that the work function of material A is smaller than that of material B, the direct physical contact of material A on material B results in an electron transfer from A to B. The materials become tribocharged. Material A becomes positively charged, and material B, which gains the electrons, becomes negatively charged.

Tribocharging occurs only when the work functions of the two materials which are in contact are different. In some rare cases, depending on the crystal structure of the materials, one may encounter a slight difference in the work function at one point of the crystal of the material as compared to another point on the surface of the same crystal. In such a case, a very small triboelectrification may occur even between the same materials.

The different rates at which plastic materials pick up charges when contacted in this manner can be used as the basis for separating material A from material B by means of electric fields when the two materials are present in a mixture. The invention is aimed at improving the extent to which the magnitude of the tribocharge can be built up in the materials, and hence at improving the efficiency of separation.

Triboelectrification may be used only between electrically insulating materials, or between metals and electrically insulating materials. Triboelectrification may not be used to separate electrically conductive materials such as two metals. For example, if one were to contact copper and nickel, a charge transfer would occur, since the work function of the nickel is considerably higher than that of copper. However, if one then tried to separate the particles, the charge would immediately flow back to where it came from, and the net result would be that both metallic particles would be neutral after separation.

BACKGROUND ART

U.S. Pat. No. 5,289,922 to Inculet et al. discloses electrostatic separation of mixed plastic waste. Inculet et al. discloses an apparatus for tribocharging particles of insulating materials. The apparatus includes a vessel for containing the particles, and the vessel is of such material that the work function of the material of the vessel is different from that of the materials of at least some of the particles in the vessel.

The vessel is rotatable, and the apparatus includes a means for rotating the vessel about an axis of rotation. The orientation of the axis of rotation is such that, in operation of the apparatus, the particles tumble against each other and against the walls of the vessel, thereby becoming tribocharged.

The mixture of the plastic materials to be separated is fed into the vessel at an entry point thereof, and emerges from the tube at an exit point thereof. The apparatus further includes means for gradually and progressively moving the material through the vessel from the entry point to the exit point; and the arrangement of the apparatus is such that the material at any point in the progression there between is kept separated from the material at other points in the progression.

The progression of the particles through the vessel is such that the particles do not mix generally, i.e. with particles at different levels of charge, but only with particles at the same level of charge. Therefore, the charge on the particles is enabled to increase progressively, without being dissipated, as the particles travel through the vessel.

The vessel is preferably in the form of a tube, which is open at each end, with the tribocharged particles entering at one end and emerging from the other end of the tube. The tube is mounted for rotation, and the axis of rotation of the tube is inclined at a slight angle to the horizontal, downwardly from the inlet to the outlet. The speed of rotation of the tube, and the said slight angle, are preferably adjustable.

The tube may include at least one rib of the same material as the tube, the rib extending radially inwardly from the inside surface of the wall of the tube. The rib is disposed along the axial length of the tube, so that as the tube rotates, the rib serves to tumble the mixture of particles residing in the tube.

The separation apparatus may further include a channel positioned in line with the end of the tube, the channel having at least one opening (e.g. an elongated slot, preferably tapered, or a plurality of small holes) along the bottom thereof for particles to drop therethrough as a curtain of particles, high voltage electrodes being arranged vertically on either side of the channel and extending there along and downwardly to separate the particles.

The aim of this construction is to provide a means of triboelectrification, which will operate highly effectively and with less capital cost and expenditure of energy than in traditional fluidized bed apparatus. Although the apparatus disclosed by Inculet et al. does achieve that aim, there are some drawbacks to the apparatus disclosed therein that this invention purposes to overcome.

Since in the electrostatic separation process, separation is based on charge to mass ratio and this ratio increases linearly when particle size decreases, uniform particle size is an important parameter in determining the purity and yield in a separation of mixed plastics. Further, fines which charge very strongly, can undesirably collect on the electrodes decreasing the electric field strength as the deposit builds up and thereby degrade the separation efficiency with time.

At one stage of the separation process, as disclosed by Inculet et al., is a channel positioned in line with the end of the tube, the channel having a plurality of openings or a tapered slot along the bottom thereof for particles to drop therethrough as a "curtain". High voltage electrodes are arranged vertically in the form of a tower on either side of the channel and extend there along and downwardly to separate the particles. The drawback in that system is that there is no instantaneous or continuous feedback to the operator of the quantity of the material distribution being separated.

To obtain a good separation and high particle throughput rates, a continuous stream of particles in a line parallel to the electrodes is required from the stage described above since the separation field acts only in a direction perpendicular to the electrodes. Also, the initial velocity of the particles entering the tower should be as uniform and as small as possible. However, both desirable qualities are not sufficiently achieved in the prior art.

DISCLOSURE OF INVENTION

It is an object of the invention to make improvements to particle distribution systems for electrostatic separation of mixed plastic waste.

It is a further aim of the invention to provide an apparatus which is versatile and simple to operate, and is compatible with other phases of plastics recycling systems, and which can be easily adjusted to suit a variety of operating requirements.

In the invention, a first embodiment of an apparatus for tribocharging particles of electrically insulating materials, comprises a rotatable drum, made of a metallic material, for containing the particles. The drum has an inlet, for charging material, and an outlet, for discharging material. Further, the apparatus has means for rotating the drum about an axis of rotation, the orientation of the axis of rotation being such that, in operation of the apparatus, the particles tumble against each other and against inner walls of the drum, thereby becoming tribocharged. A fines removal mesh screening means is arranged on an outer surface of the drum, to allow fines to escape from inside the drum.

The drum advantageously comprises at least two separate sections, joined together by a plurality of mixing bars arranged on an internal surface of the sections. The mixing bars are radially spaced out and positioned longitudinally along an inner wall of the drum. The fines removal mesh screening means may further be partly covered by a metal band, to provide mechanical strength to the screening means.

The drum may further comprise an air flow stream directing means, arranged adjacent the fines removal mesh screening means, to direct an air flow against the screening means to thereby prevent the screening means from clogging with loose material flowing in the drum.

A second embodiment of an apparatus for tribocharging particles of electrically insulating materials, comprises a rotatable drum, made of a metallic material, for containing the particles. The drum has an inlet, for charging material, and an outlet, for discharging material. Further, the apparatus has means for rotating the drum about an axis of rotation, the orientation of the axis of rotation being such that, in operation of the apparatus, the particles tumble against each other and against inner walls of the drum, thereby becoming tribocharged. An electrostatic separation tower, having tapering walls and at least one pair of electrodes arranged on opposite walls of the tower, is arranged adjacent the outlet. The discharged particles fall into the tower and are separated in an electric field generated between the at least one pair of electrodes.

The apparatus further preferably comprises monitoring means for providing instantaneous feedback to an operator of the quantity of waste being separated in the tower.

The monitoring means advantageously comprises an array of lasers, which are arranged on one side wall of the tower, the light emitted from the lasers being directed across a lower part of the tower, substantially perpendicular to the electrodes and an array of photodiodes, arranged similarly to the array of lasers but on the opposite side wall to the laser array. The array of photodiodes is arranged to detect the intensity of the light, which reaches the array of photodiodes from the array of lasers. The monitoring means further preferably comprises an amplifying, inverting and converting means, for amplifying, inverting and converting the output from the array of photodiodes, a multiplexing means, for polling the collected data and a computer, to which the polled data is fed and where the data is displayed on a display means.

The apparatus further preferably comprises a plurality of vanes, arranged at the outlet of the drum and attached along an inner wall of the drum, to even the outflow of particles from the drum via the outlet.

The apparatus further advantageously comprises a funnel, arranged below the outlet and between the outlet and the electrostatic coarse separation tower, to direct particles away from a central position of said funnel. The funnel preferably comprises a roof shaped structure, arranged in the interior of the funnel. The roof shaped structure advantageously has fixed vanes to further direct particles awayfrom the central position of the funnel. The funnel further advantageously comprises an exit channel having a rod, arranged to ensure a minimum particle velocity for particles leaving the exit channel.

Further features of the invention will be described or will become apparent in the course of the following detailed description.

BRIEF DESCRIPTION OF DRAWINGS

In order that the invention may be more clearly understood, the preferred embodiment thereof will now be described in detail by way of example, with reference to the accompanying drawings, in which.

BEST MODE FOR CARRYING OUT THE INVENTION

As shown in FIGS. 1–7, a preferred embodiment of the invention is shown in FIGS. 1 to 7. An apparatus for electrostatic separation of mixed plastic waste particles is generally designated 50. The apparatus comprises a drum 1 having an inlet 11 and an outlet 13.

Figure 4:
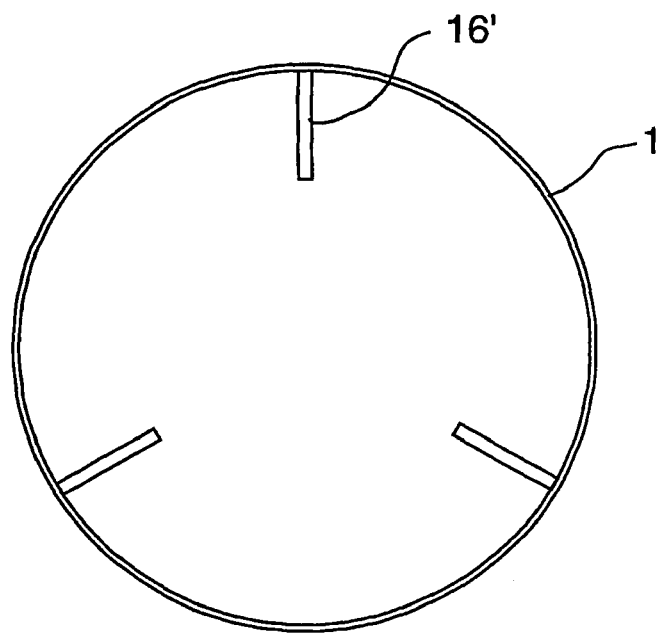
FIG. 4 is a frontal sectional view of the drum, seen from line A—A of FIG. 2.
Figure 4A:
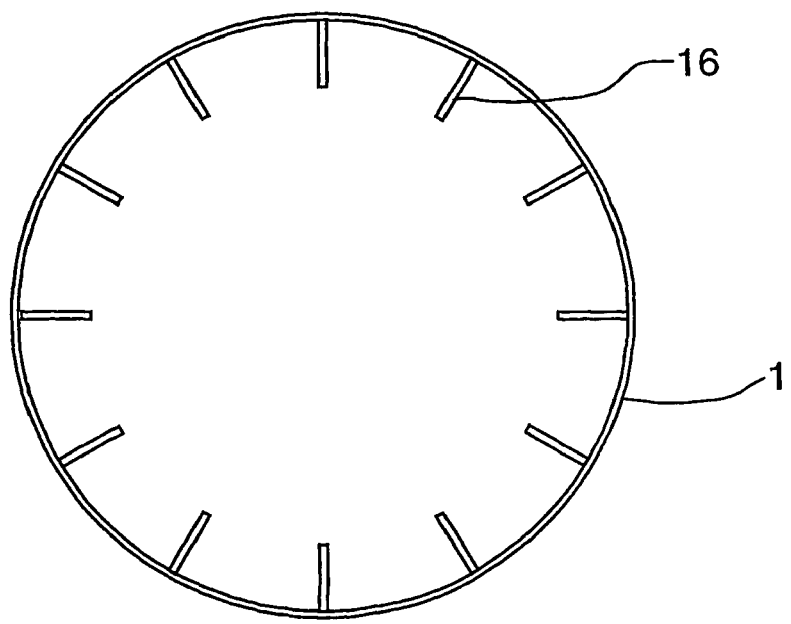
FIG. 4*a* is a frontal sectional view of the drum, seen from line B—B of FIG. 2.
Figure 5:
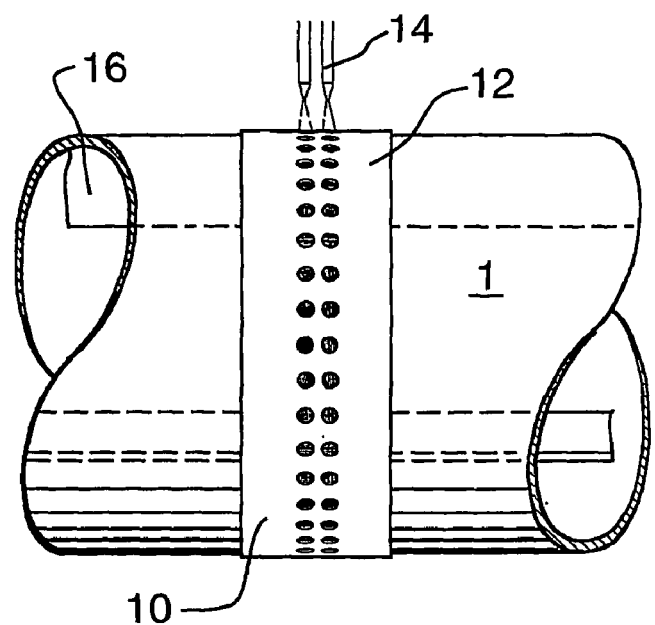
FIG. 5 is a partial sectional side view of the screening area of the drum.

The drum is inclined with the inlet located higher than the outlet, so that charged plastic waste is transported from the inlet to the outlet when the drum is rotated. The drum further has preferably longitudinally spaced apart drum support ribs 4 arranged at an outer surface of the drum. The support ribs engage with at least one driving wheel 7, preferably made of rubber or being rubber coated for enhanced friction. Advantageously, and for increased traction between the drum 1 and the driving wheels 7, a pair of driving wheels is arranged having the rotation axis of the wheels parallel to the rotation axis of the drum and the wheels of the pair are arranged on opposite sides of a vertical plane through the centre of the drum. The at least one driving wheel is propelled by a drive unit 8, for example an electric motor. The drum is preferably divided into sections, for example a first section 3 and a second section 5. The joint between two sections has internal mixing bars 16', which align and support the different sections as well as provide additional mixing of the waste. The mixing bars are radially spaced-apart and positioned longitudinally along the inner wall of the drum, as shown in FIGS. 4 and 5. There are at least three of these mixing bars, to properly align and support the drum sections forming an uninterrupted elongated drum. The drum 1 is preferably positioned atop a frame 9, to elevate the drum sufficiently above floor level.

Figure 5A:
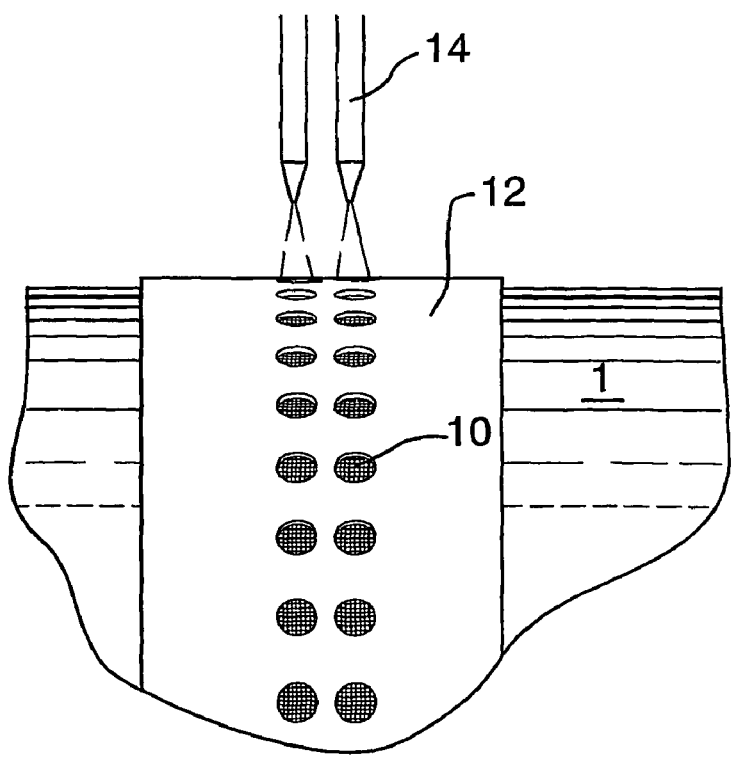
FIG. 5*a* is a close up view of FIG. 5, showing the air nozzles and screen.
Figure 6:
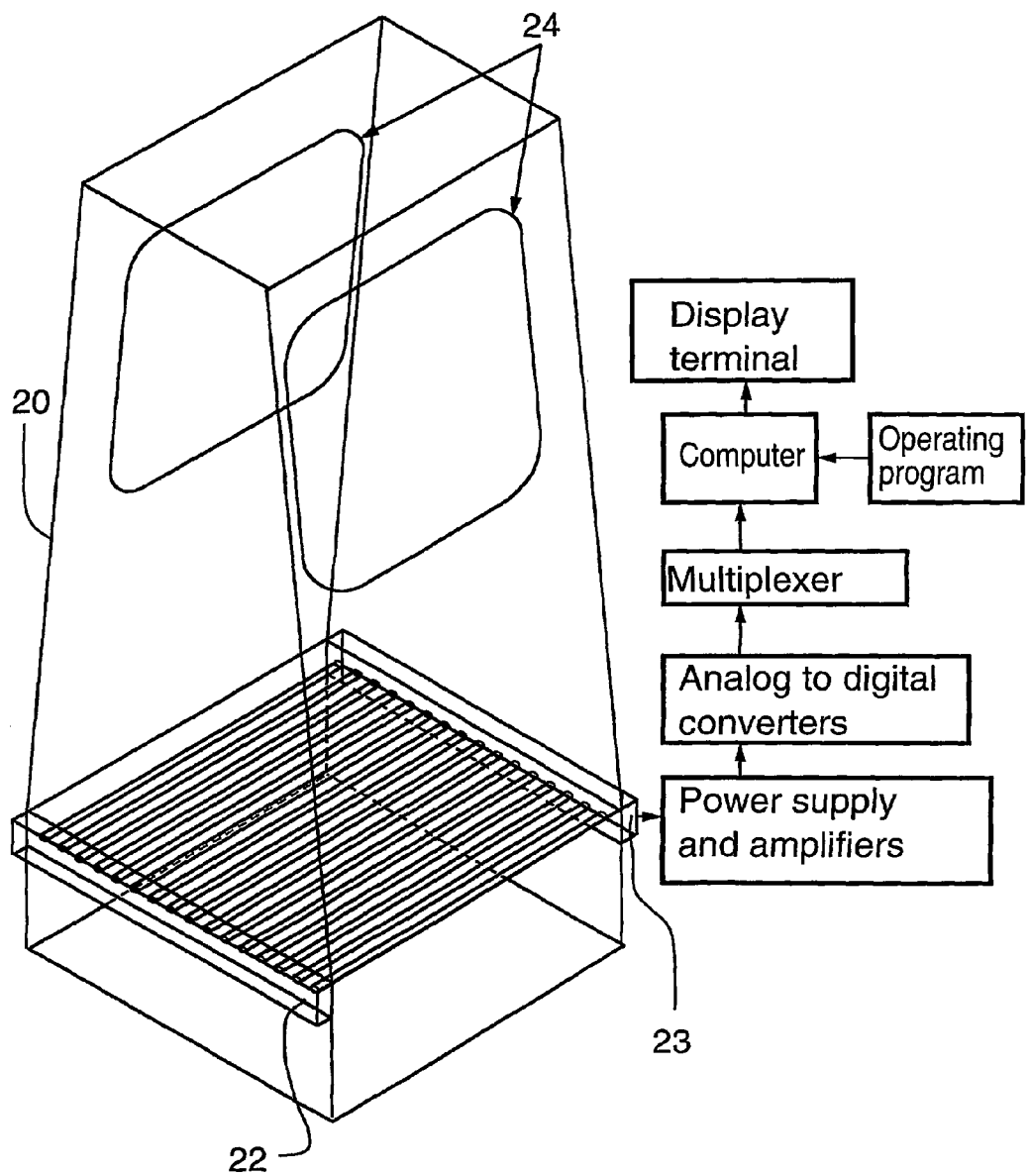
FIG. 6 is a schematic diagram of the monitoring system of the separation system.

Positioned between and abutting the outer circumference of the two sections is a mesh screen 10, as shown in detail in FIGS. 5 and 5a. The screen is, advantageously, approximately 5 to 10 cm in width. The mesh screen size is appropriately selected for the desired application, as will be described in greater detail below. A metal band 12 is affixed with appropriate fastening means, for example screws, glue or solder, to an outside surface of the drum sections. The metal band provides mechanical strength and prevents puncturing of the screen. Positioned above the drum and adjacent to the area of the screen is an air flow stream directing means 14, for example air nozzles, connected to a pressurized air source (not shown). The air flow stream is directed onto the screen 10 to prevent the screen from clogging with the loose material flowing in the drum. In one embodiment of the invention, an electrostatic fines separation tower 20', positioned just below the screen, whose parameters are optimized for fine particles, separates the finer material that falls through the screen. Alternatively, the fines can simply be collected and discarded if the quantity of fines makes their separation uneconomical. This may be done in any suitable vessel, such as plastic containers or bags etc.

An electrostatic coarse separation tower 20 is arranged adjacent the outlet 13 of the drum 1. The electrostatic coarse separation tower has at least one pair of electrodes 24, which generate an electric field between them. Particles 6 falling in the electric field will take different trajectories depending upon the electric charge of the individual particles. In this way, the particles are separated into different fractions consisting of one material group per fraction. This greatly facilitates recuperation and reuse of waste plastics.

Figure 2:
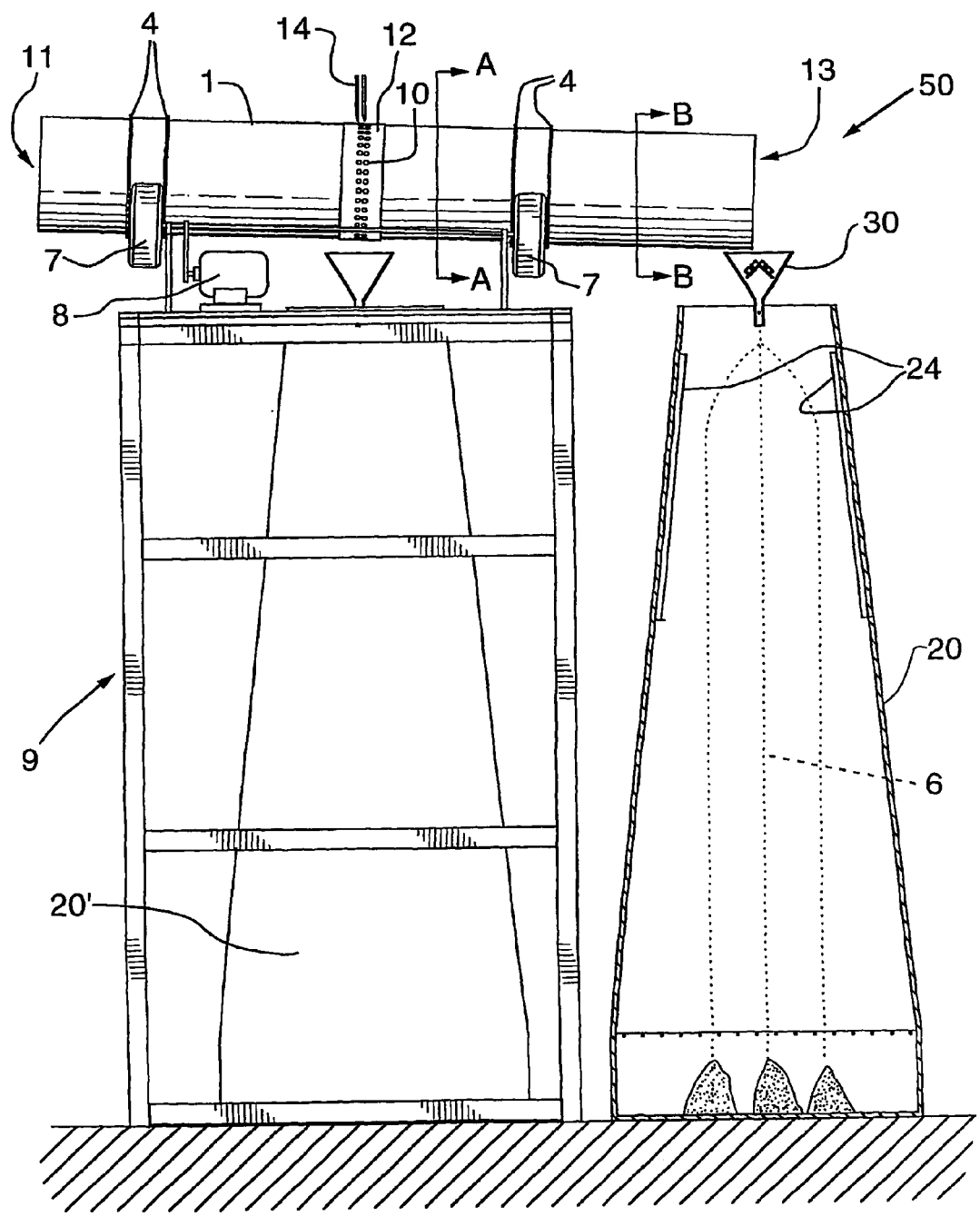
FIG. 2 is a side view of the system.
Figure 2A:
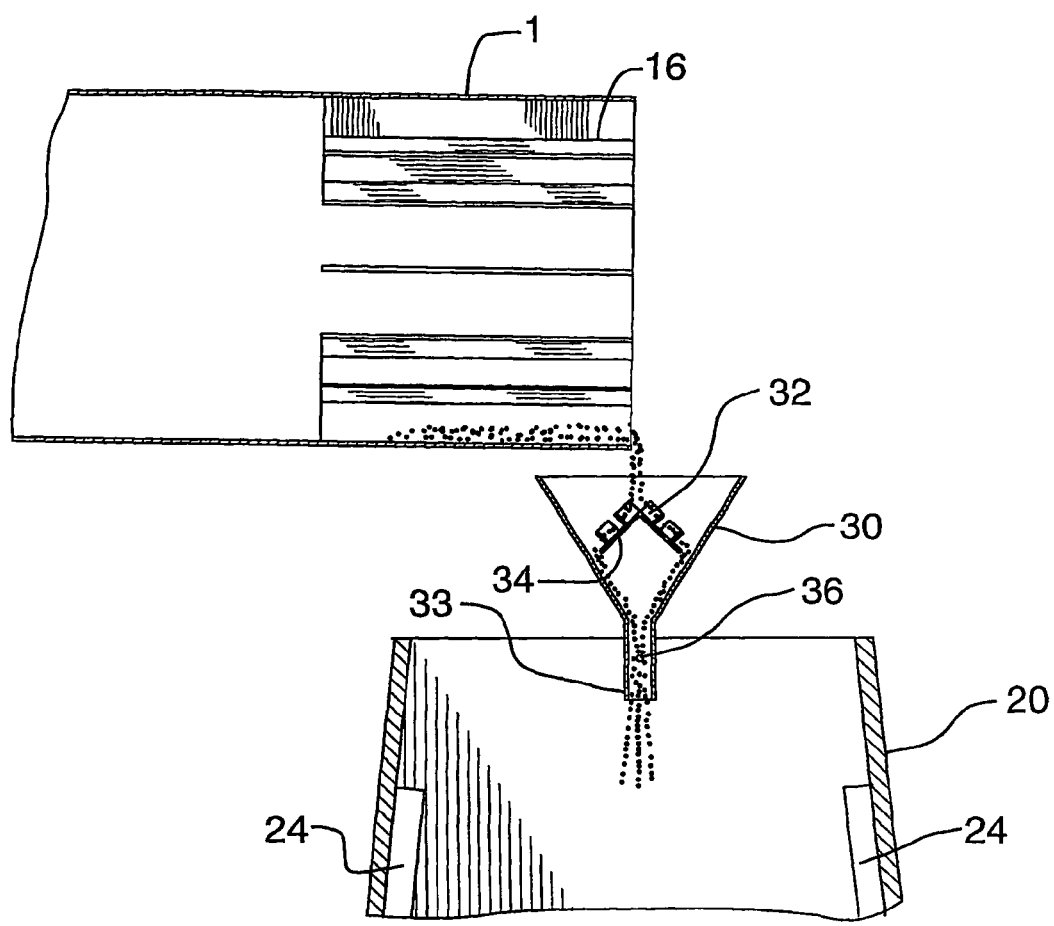
FIG. 2*a* is a partial sectional view of the area where the tube dispenses particles into the distribution funnel.
Figure 2B:
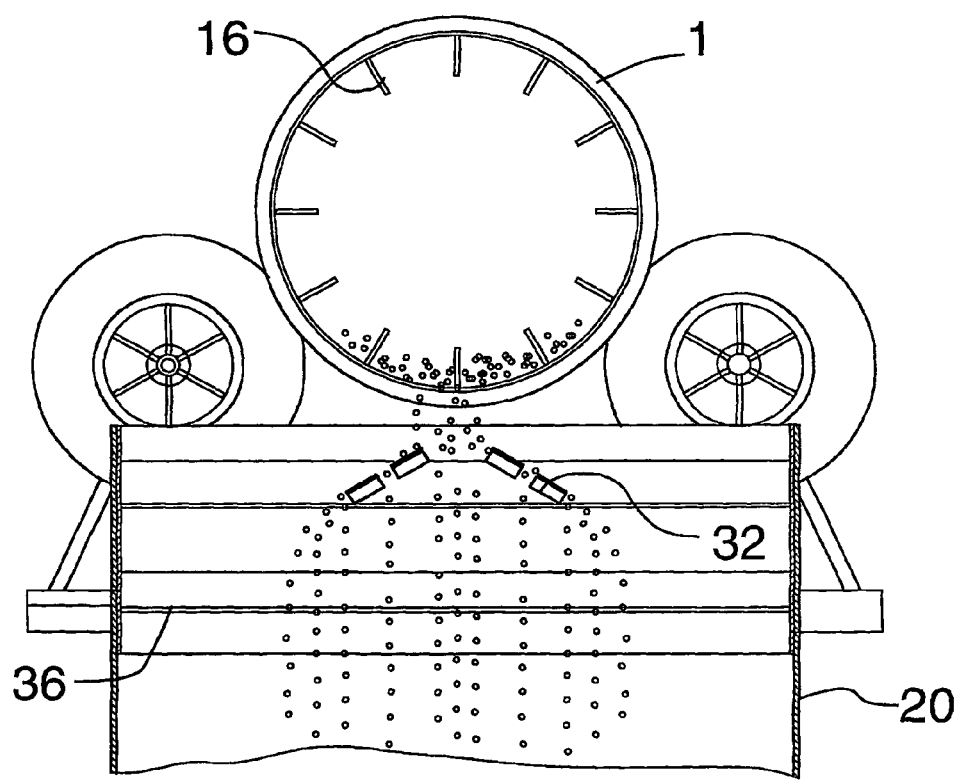
FIG. 2*b* is an upper frontal view of the system.
Figure 3:
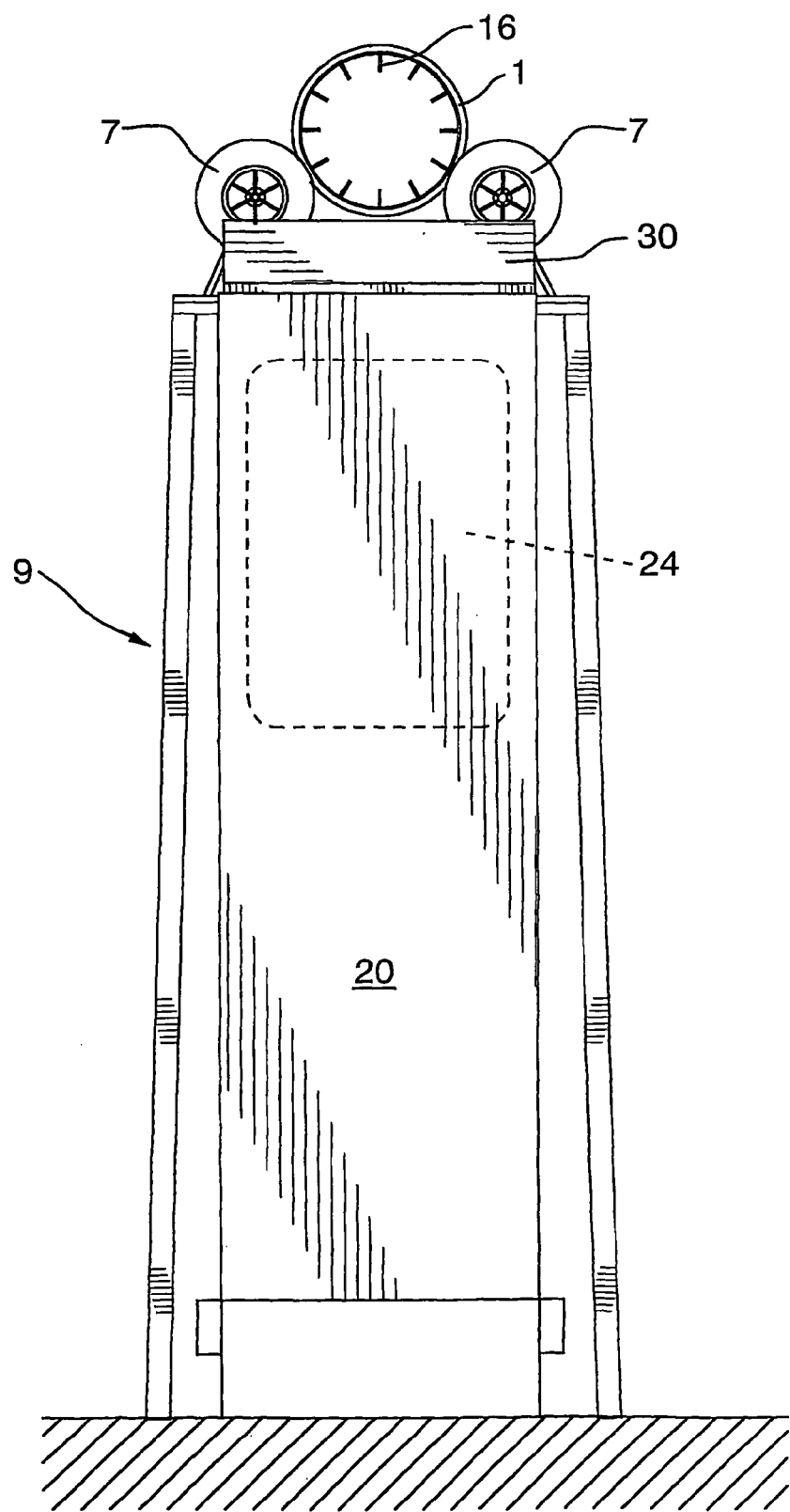
FIG. 3 is a frontal view of the system.

To produce a desirable "curtain" of particles 6, after the particles exit the rotating drum 1, a series of vanes 16, approximately 10 cm in length and preferably at least ten in number, are attached to the interior surface of the drum at the outlet 13 of the drum (FIGS. 2a and 2b). The vanes serve to even the flow of particles from the outlet and to spread the particles in a direction along the length of the electrodes, as shown in FIG. 2b. To further minimize the velocity of particles exiting the drum and to spread the particles in a line parallel to the electrodes, a funnel 30 is advantageously positioned just below the drum outlet and arranged between the outlet and the electrostatic coarse separation tower 20. The funnel has an exit channel 33 having an opening at the bottom thereof, the opening preferably being 8 to 10 mm wide. The opening size is dictated by the maximum particle size to be found in the input waste materials and is specified as twice the maximum particle size. In the interior of the funnel 30 is a roof shaped structure 34 on which small fixed vanes 32 are mounted to direct the particles away from the central position of the funnel, where the particles fall out of the drum, along a line parallel to the electrodes 24. The pattern of vanes is illustrative only, since other arrangements could be found which also distribute particles in the desired manner. A small rod 36, arranged approximately half way down the exit channel from the funnel, ensures a minimum particle velocity as particles do not have a straight falling path in leaving the funnel.

Figure 1:
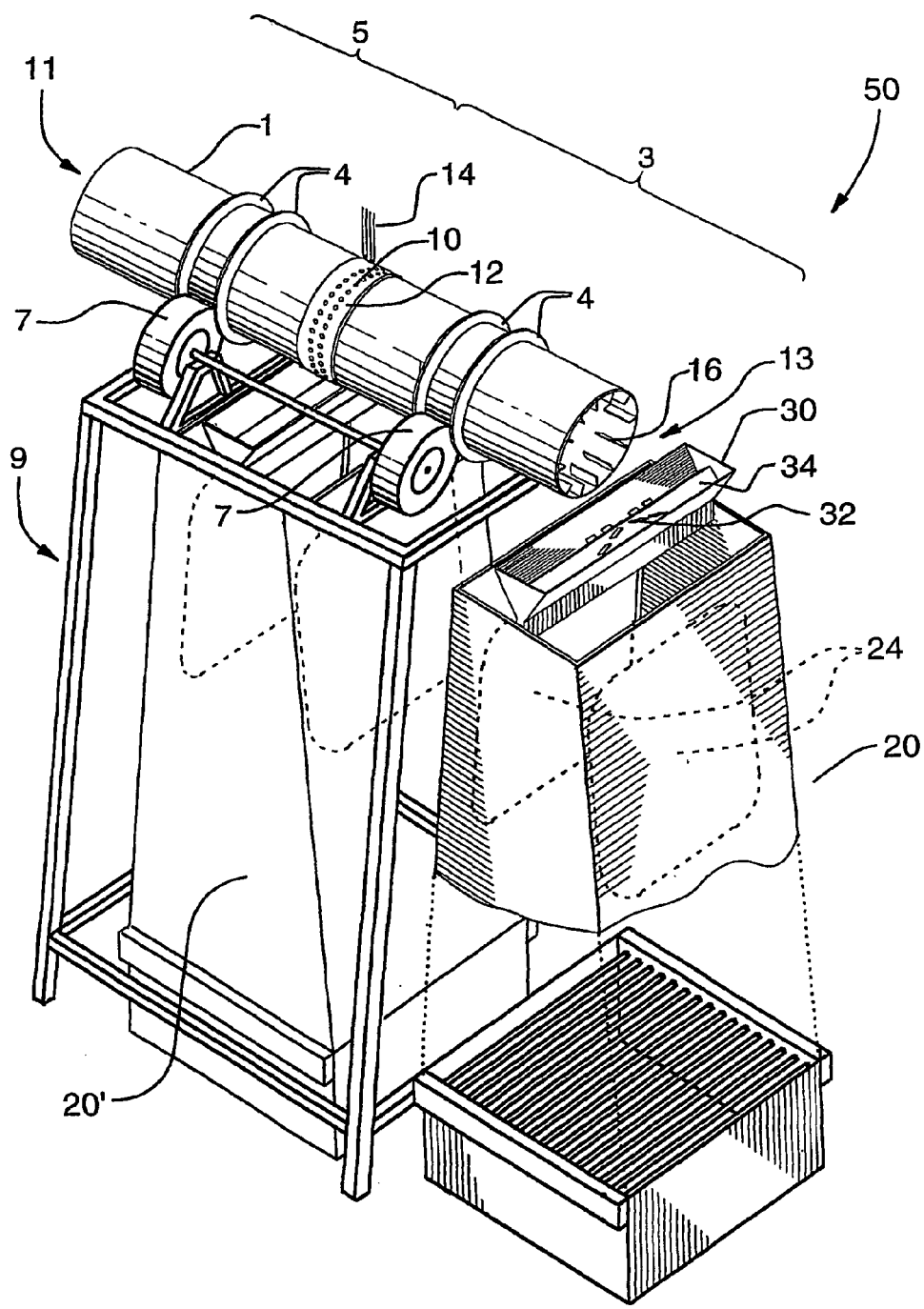
FIG. 1 is a perspective view of the particle distribution system overall for electrostatic separation of mixed plastic waste.
Figure 7:
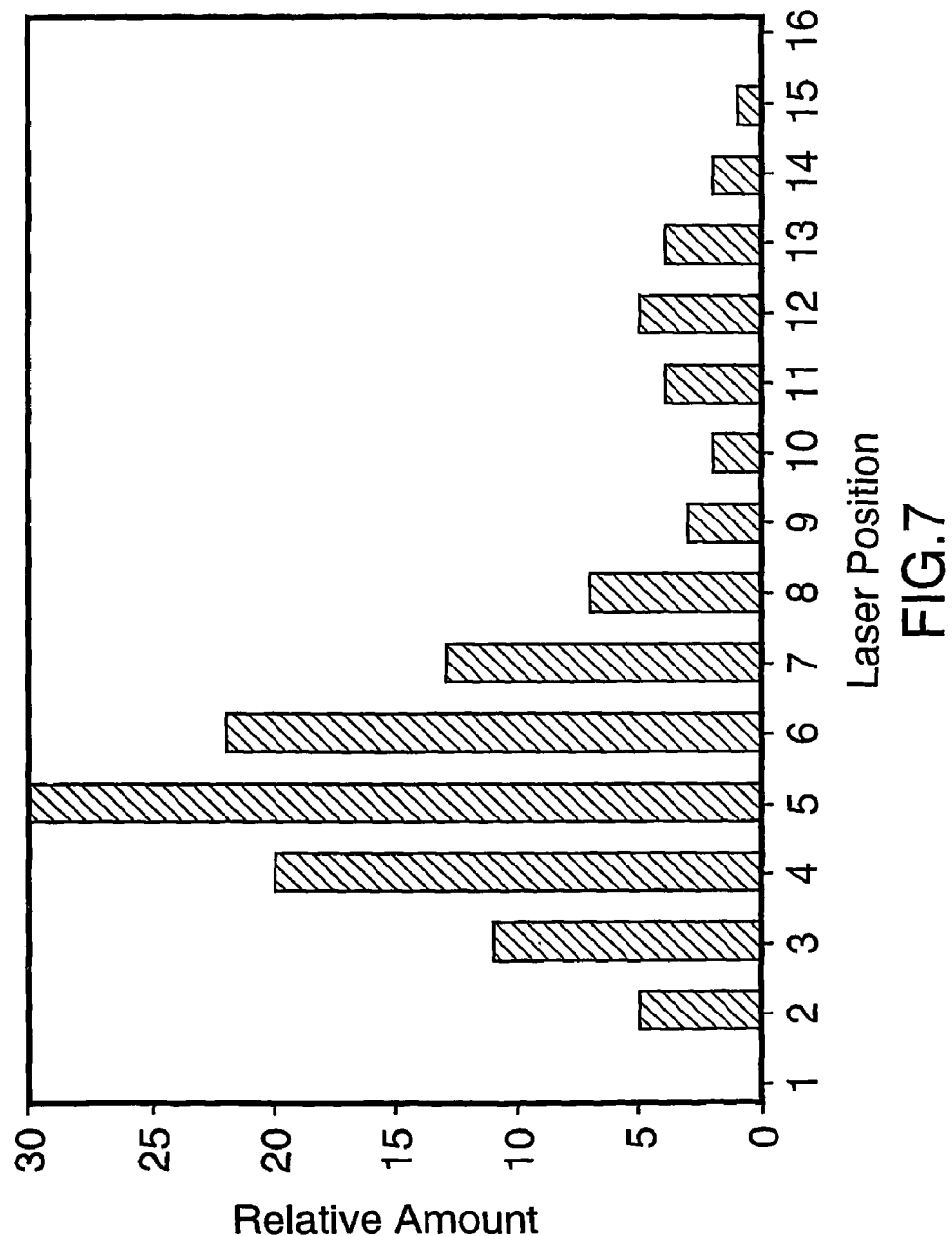
FIG. 7 is a histogram of the quantity of particles at an illustrative instant of time.

To produce a desirable instantaneous feed back of the operation of the electrostatic coarse separation tower 20, the overall structure of the apparatus 50 for electrostatic separation of mixed plastic waste is as illustrated in FIGS. 1 and 2. To display the material distribution as the particles 6 fall through the electrostatic field in electrostatic coarse separation tower 20, a unit has been designed and built as shown diagrammatically in FIG. 6. The electrostatic field is generated between the at least one pair of electrodes 24, arranged on opposite side walls of the tower. A monitoring means preferably consisting of an array of lasers 22, which are arranged on one side wall of the tower. The emitted light from the lasers is directed across a lower part of the tower, substantially perpendicular to the electrodes 24. Preferably sixteen individual lasers are used, although the actual number depends on, inter alia, the size of the tower. The intensity of the light, which reaches the far side wall of the tower, is detected by an array of photodiodes 23, arranged similarly to the array of lasers but on the opposite side wall to the laser array. The output from the photodiodes is amplified, inverted and converted to an eight-bit digital number by a control unit. Using a multiplexer, the collected data is polled and fed into a computer, where the data is displayed on a display means, for instance as a histogram as illustrated in FIG. 7. The height of the bars represents the quantity of material falling through that portion of the electrostatic coarse separation tower and the pattern of the histogram can be used to evaluate on a continuous basis the effectiveness of the separation.

The fines removal screen structure has a number of advantages over the prior art. Since the material is separated by size into two fractions which are then separated electrostatically, the quality and yields of the separation are improved. Furthermore, since the two fractions are separated in different electrostatic towers, the field can be optimized for the small and large particles, thus giving better separations. Since fines can be removed before entering the electrostatic coarse separation tower 20, contamination of the electrodes in the separation tower can be minimized. The presence of the vanes 16 at the outlet 13 of the drum results in material exiting the drum in a substantially continuous flow, with no sudden bursts of large amounts of material. The interior structure of the funnel, in which the roof shaped interior piece 34 prevents the particles from falling in a clear path from the exit of the drum into the electrostatic coarse separation tower, decreases the velocity of the particles entering the tower. The vanes 32 on the interior of the funnel direct the material along a line parallel to the electrodes in the tower. Hence, the throughput is improved without degrading performance, caused by extreme numbers of particles falling through a limited region of space, with the result being that the charge on the particles is shielding nearby particles from the full field required for proper separation. An instantaneous indication of the effectiveness of the separation is displayed for the operator on which he or she can base decisions concerning whether the unit is operating properly. For a binary 50—50 mixture, for example, a bimodal distribution would be expected, while for a 95–5 mixture, a gaussian distribution with a shoulder on one side is to be expected. Deviations from the expected and displayed patterns would be cause for the operator to seek the cause for the deviation. The storage of distribution patterns during a successful separation of a particular mixed feed would allow the operator to call up such a pattern and compare the current pattern as a means of assuring that proper operation of the unit is occurring. This is particularly important when returning to a particular feed material after periods when other feeds have been separated. The attenuation of the laser beam is proportional to the quantity of material that falls between the laser and the detector. Therefore, the histogram, after calibrations, can be used to total the quantity of material being processed by the separation unit. Further, yields can be calculated based on the position of the separators used to establish product streams.

In the described separation process, particles are fed into a slightly tilted rotating drum. The particles tumble over one other resulting in charge transfer by contact electrification. Because of the tilt, the particles gradually move to the exit end of the drum having become fully charged. They then fall vertically through the electrostatic coarse separation tower in which the electric field is maintained by electrodes held at high voltage. As a consequence of the field, particles move toward either the positive or negative electrode depending on the polarity of the charge on each individual particle and separation according to plastic type is effected.

1. Particle Size, Particle Size Range and Fines:

The process depends on the ability of charged particles to be drawn a significant distance horizontally by the electrostatic forces in the separation tower. Measurements show that the larger the charge to mass ratio, the further the particles will be moved by the electric field. The charge, which a particle can attain, depends on the surface area which scales as the square of particle size, while the mass depends on the volume, which scales with the cube of particle size. Thus charge to mass ratios increase as particle size decreases. Smaller particles can be more easily moved by the electric forces.

Practically, voltages above about 60 kV are difficult to sustain. This limits the practical electric field to about 400 kV/m with an electrode spacing of about 300 mm. Since plastics have densities which usually are close to 1 gram/cubic centimeter, the upper limit of particles which can be moved significantly in such an electric field is about 10 mm. This defines the largest particles which can be separated by the process. The exception to this is plastic foam particles, such as polyurethane, whose density is lower by a factor of about 10. For such materials, the upper limit to the particle size is about 20 mm.

At the lower limit, particles which are very fine, below about 100 micrometers in size, when charged with opposite polarity will stick together due to the electrostatic forces between the particles. This bond cannot easily be broken by mechanical means such as impact on a surface. The combined particles will then act in an electric field as if they were a single particle with a charge equal to the sum of positive and negative charges—a value close to zero. Obviously, for such combined particles separation is not effective. Thus, the process can be applied to particles in the range from about 100 micrometers to 10 mm.

The ideal feed for the process is a material with a very narrow particle size range. In that case, each particle will be charged to about the same total charge and the charge to mass ratios of each particle will be very closely the same. This leads to a very narrow range of horizontal displacements in the separation tower for particles of the same plastic. Particles of different sizes of the same plastic will have a range of charge to mass ratios, a wider range of horizontal displacements and hence poorer separation results. Practically, good separation is obtained with a range of particle sizes of a factor of 3, e.g. 2 to 6 mm.

Fines present in a waste material mixture must be removed for high purity separation results. Fine particles of one plastic charged at one polarity attach themselves to large particles of a different plastic charged at opposite polarity. Again mechanical forces are not able to dislodge these fine particles, which are then carried over into the large particle product stream reducing the purity obtained. For high purity separations, these small particles must be removed, for example by air elutriation or screening, prior to the separation process.

2. Moisture:

The process depends on charging by contact, or triboelectrification, in which charge is transferred during the contact of two dissimilar non-conducting materials. The materials must by dry enough that surface conductivity is low. Although conducting materials will also charge by contact, much of the transferred charge leaks back as the contact is broken. Generally conducting materials charge less well than insulating materials. Moisture, in the form of high humidity or high moisture content materials, leads to increased surface conductivity thereby lowering or completely destroying any contact charging. Practically, the materials must be exposed to a humidity of 50% R.H. or lower for proper charging to occur. Test results show how the separation degrades when humidity increases to above 50% R.H. The humidity must be controlled in the region around the drum, and the material entering the drum must be dry. High humidity in the vicinity of the drum can be circumvented by heating the materials by approx. 10° C. immediately before separation. In this case, the short time the materials reside in the drum is not sufficient for their surfaces to become saturated with moisture that would destroy the charging.

3. Charging Time:

The charging process depends on a multitude of contacts (many thousands), so that the quantity of charge density on the surface of any particle does not vary a great deal from the mean change density. This is critical to separation quality. The charging is a self limiting process, in which particles which are fully charged will not have further charge transfer in contacts. Practically, residence times of 0.5 to 2 minutes in the drum, which is rotating at 10–20 rpm, is sufficient to achieve uniform and sufficient charging.

4. Drum Geometry and Material:

If two dissimilar materials are in contact in the absence of an external electric field, charging of the particles will result. If an electric field is present, which is in a direction opposing the transfer of charge, no charge will transfer or if the field is strong enough, charge transfer in the opposite direction will result. Thus for a successful process, charging must occur in a field free situation. Such is the case inside a conducting drum.

Hence, the drum is preferably made of a metallic material. If the drum is made of an insulating material, very large charges can be built up on the inside of the drum. This charge could suddenly break down the insulation and result in a large charge spike which could be fatal to a person in contact with the drum. For the same reason, any conducting drum must be carefully grounded. At the same time, in an insulating drum, the charge which positively charged particles attain must be exactly balanced by the charge negatively charged particles attain, i.e. charge cannot be created or destroyed. On the other hand, in a grounded conducting drum, charge need not be balanced since charge can be passed to the particles through the drum. This is important when removing small concentrations of one material from an almost pure material, the major material can become significantly charged, improving the separation.

5. Overcharging:

For materials less than approx. 2 mm in average particle size, and for materials which charge very strongly, such as Teflon in the presence of polyethylene or even polyvinyl chloride, charging can be so strong that particles will clump together and separation will be unsuccessful. The solution is to reduce the residence time in the charging drum to 15 to 30 seconds.

6. Mixture Composition:

For 50—50 mixtures of two components, each of the materials will charge roughly equally. The separated material at the base of the separation tower will form a bimodal distribution with the majority of the positively charged component falling toward the negative electrode and the negatively charged material falling toward the positive electrode. As the concentrations become one sided, for example a 95-5 mix, the minor component charges very strongly since each particle is almost always contacting a major component particle, while the major component charges little since each particle is mostly contacting the same material which results in no charge transfer. Thus the minor component, if positive charging, will still be drawn toward the negative electrode but the major component will fall closer to the central axis of the tower.

For mixtures of more than two components, there will always be a dominant negative charging material or a dominant positive charging material. However, when one of the dominant charging materials is removed from the mixture and the remaining material is recharged in the drum, the charging will be quite different. For example in a mixture containing Teflon (PTFE), polyethylene (PE) and polyvinyl chloride (PVC), the PTFE will charge negatively and be drawn toward the positive electrode, while both the PE and PVC will charge positively and be drawn toward the negative electrode. However, after the PTFE has been removed, the PVC will charge negatively while the PE will continue to be charged positively. In this way, because charging changes as components are removed, multiple passes through the separation process can unravel complex mixtures.

7. Field Entry Parameters:

Particles falling from rest in gravity in air are quickly accelerated to higher and higher velocities. To maximize the effect of the horizontal electric field on the charged particles, the velocity at which they fall through the field should be minimized. Ideally, they should start from rest just as they enter the electrostatic field. To that end, a funnel was designed so that the particles are forced to move back and forth and slide along inclined planes after leaving the drum before entry into the electric field. This serves to slow the particles to a minimum velocity before entering the field. At the same time, all particles should enter the field along the axis between the electrodes. The capacity of the unit can be limited if too many particles simultaneously enter the field at any point between the electrodes. These charged particles can lead to a space charge, which will decrease the field and reduce separation efficiency. The same surfaces which are used to slow the particles are also used to guide the particles, so that they enter the field along a line parallel to the electrodes. Thus, a separation tower one meter in length can easily accommodate a throughput of 1 tonne/hour.

It will be appreciated that the above description relates to the preferred embodiment by way of example only. Many variations on the invention will be obvious to those knowledgeable in the field, and such obvious variations are within the scope of the invention as described and claimed, whether or not expressly described.

For example, instead of a metal band and a separate mesh screen combination of components, an integral band having mesh screen portions along its circumference is envisioned. Further, although only two sections are described as making up the drum, three or more sections may also be employed. Accordingly, additional mesh screening areas may be incorporated between these additional sections. Mesh screening areas further down in the direction of material flow, may remove coarser particles than those screening areas before them. A plurality of small rods, arranged in an appropriate pattern across the funnel opening, may serve to further distribute the particles along the opening cross-section. The light beams could be created by lamps and lenses, although the parallel light of a laser is preferred.

INDUSTRIAL APPLICABILITY

The present invention relates to an apparatus for electrostatic separation of mixed plastic waste, the recuperation thereof being both environmentally and economically motivated.

What is claimed is:

1. An apparatus for tribocharging particles of electrically insulating materials, comprising:

a rotatable drum, made of a metallic material, for conveying the particles (6), said drum having an inlet and an outlet, said drum being slightly inclined so that said outlet is slightly lower than said inlet;

means for rotating the drum so that said particles tumble against each other and against inner walls of the drum, thereby becoming tribocharged, and advance from said inlet to said outlet;

an electrostatic separation tower having at least one pair of electrodes arranged on opposite walls of said tower, for separating said particles falling from said drum into said tower, in an electric field generated between said at least one pair of electrodes; and monitoring means for providing instantaneous feedback to an operator of the quantity of particles being separated in said tower.

2. The apparatus according to claim 1, wherein said monitoring means comprises:

an array of lasers, which are arranged on one wall of said tower, the light emitted from the lasers being directed across a lower part of said tower, substantially perpendicular to the electrodes; and an array of photodiodes, arranged similarly to said array of lasers but on the opposite wall of said tower, said array of photodiodes being arranged to detect the intensity of the light, which reaches said array of photodiodes from said array of lasers.

3. The apparatus according to claim 2, wherein said monitoring means further comprises:
an amplifying, inverting and converting means, for amplifying, inverting and converting the output from the array of photodiodes;
a multiplexing means, for polling the collected data; and
a computer, to which the polled data is fed and where the data is displayed on a display means.

4. The apparatus according to claim 1, further comprising means for heating the materials slightly, before introduction to said drum, so as to reduce their moisture.

5. The apparatus according to claim 1, further comprising fines removal mesh screening around a portion of said drum ahead of said outlet, to allow fines to escape from said drum before reaching said outlet.

6. The apparatus according to claim 5, wherein said drum further comprises an air flow stream directing means, arranged adjacent the fines removal mesh screening, to direct an air flow against said mesh screening to prevent said mesh screening from clogging with loose material flowing in said drum.

7. The apparatus according to claim 1, wherein said drum has a plurality of mixing bars arranged longitudinally along an inner wall of said drum.

8. The apparatus according to claim 1, wherein said apparatus further comprises a funnel, arranged below said outlet and between said outlet and said electrostatic separation tower.

9. The apparatus according to claim 8, further comprising a roof-shaped structure above said funnel to direct particles away from the centre of said funnel.

10. The apparatus according to claim 8, wherein said funnel further comprises an exit channel having a rod arranged therein to reduce particle velocity for particles leaving said exit channel.

11. The apparatus according to claim 9, wherein said funnel further comprises an exit channel having a rod arranged therein to reduce particle velocity for particles leaving said exit channel.

* * * * *